United States Patent [19]
Wiggins

[11] Patent Number: 6,056,112
[45] Date of Patent: May 2, 2000

[54] APPARATUS FOR PRELOADING A SCRAPER BLADE IN A CONVEYOR CLEANING SYSTEM

[75] Inventor: Daniel G. Wiggins, Marquette, Mich.

[73] Assignee: Argonics, Inc., Marquette, Mich.

[21] Appl. No.: 09/081,896

[22] Filed: May 20, 1998

[51] Int. Cl.$^7$ ................................................. B65G 45/00
[52] U.S. Cl. .......................................... 198/499; 198/497
[58] Field of Search ..................................... 198/497, 499

[56] References Cited

U.S. PATENT DOCUMENTS

| | | |
|---|---|---|
| 2,733,476 | 2/1956 | Eck . |
| 2,760,553 | 8/1956 | Lie . |
| 2,867,103 | 1/1959 | Williams . |
| 3,313,556 | 4/1967 | Colwell . |
| 3,504,786 | 4/1970 | Matson . |
| 3,592,433 | 7/1971 | Fuhrman . |
| 3,674,131 | 7/1972 | Matson ................................... 198/497 |
| 3,778,082 | 12/1973 | Grosseau . |
| 3,787,923 | 1/1974 | Peterson . |
| 4,063,474 | 12/1977 | Klopping . |
| 4,157,021 | 6/1979 | Tsuchiya . |
| 4,171,920 | 10/1979 | Kramer et al. . |
| 4,185,399 | 1/1980 | Gladish . |
| 4,240,471 | 12/1980 | Rotrekl et al. . |
| 4,290,520 | 9/1981 | Rhodes . |
| 4,348,786 | 9/1982 | Hirose . |
| 4,402,394 | 9/1983 | Stoll . |
| 4,436,249 | 3/1984 | Santa Lucia et al. . |
| 4,487,245 | 12/1984 | Shininohara et al. . |
| 4,533,035 | 8/1985 | Reiter . |
| 4,533,036 | 8/1985 | Gordon . |
| 4,586,600 | 5/1986 | Lindbeck . |
| 4,768,644 | 9/1988 | Cromm ................................... 198/499 |
| 4,776,295 | 10/1988 | Kline . |
| 4,818,019 | 4/1989 | Mrotz, III . |
| 4,825,997 | 5/1989 | Bowman et al. . |
| 4,921,231 | 5/1990 | Reynolds et al. . |
| 4,925,434 | 5/1990 | Swinderman et al. . |
| 4,969,553 | 11/1990 | Stoll . |
| 4,995,851 | 2/1991 | Taylor et al. . |
| 5,014,844 | 5/1991 | Anttonen . |
| 5,088,965 | 2/1992 | Swinderman et al. . |
| 5,090,453 | 2/1992 | Stacher et al. . |
| 5,201,402 | 4/1993 | Mott ........................................ 198/499 |
| 5,222,588 | 6/1993 | Gordon ................................... 198/497 |
| 5,301,797 | 4/1994 | Hollyfield, Jr. et al. . |
| 5,344,000 | 9/1994 | Gleason . |
| 5,378,202 | 1/1995 | Swinderman ......................... 198/499 |
| 5,385,507 | 1/1995 | Swearingen et al. . |
| 5,417,407 | 5/1995 | Gordon . |
| 5,611,524 | 3/1997 | Gordon . |

Primary Examiner—Christopher P. Ellis
Assistant Examiner—Joe Dillon, Jr.
Attorney, Agent, or Firm—Wood, Phillips, VanSanten, Clark & Mortimer

[57] ABSTRACT

An apparatus is provided for preloading a scraper blade against a conveyor belt in a conveyor cleaning system. The apparatus includes a blade support adapted to mount a scraper blade for engagement with a conveyor belt, a torsion member including a first end segment spaced from a second end segment along an axis, and a stop engageable with the second end segment to maintain the torsion member in a preloaded condition with the second end segment rotated about the axis relative to the first end segment to generate a preload between a scraper blade mounted on the blade support and a conveyor belt. In one form, the first end segment has an essentially polygonal cross section engageable with the blade support to restrict rotation of the first end segment relative to the blade support.

29 Claims, 3 Drawing Sheets

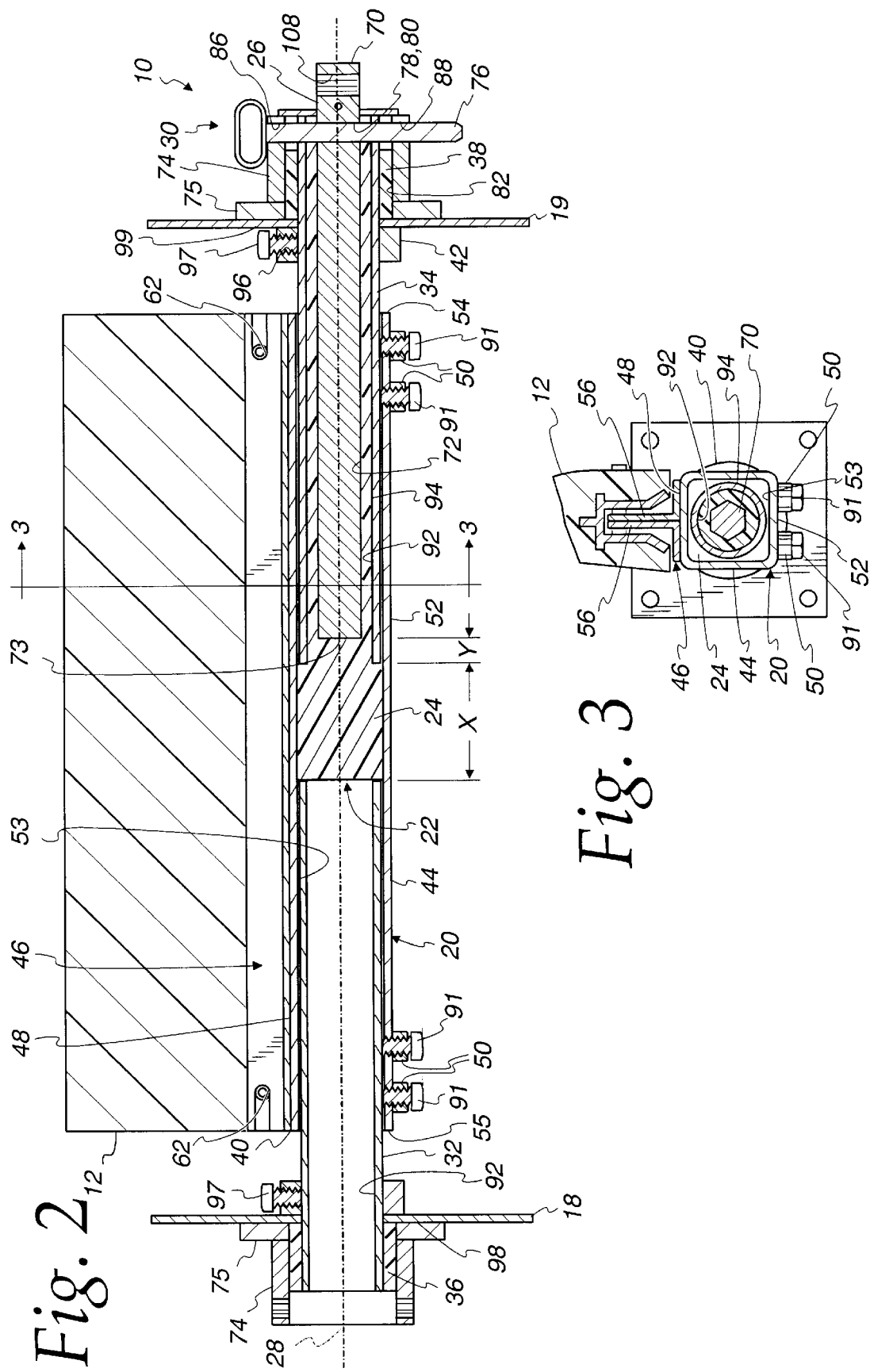

(patent text follows)

APPARATUS FOR PRELOADING A SCRAPER BLADE IN A CONVEYOR CLEANING SYSTEM

FIELD OF THE INVENTION

This invention relates to conveyor cleaning systems, and more particularly, to apparatus for preloading a scraper blade against a conveyor belt in a conveyor cleaning system.

BACKGROUND OF THE INVENTION

Conveyor belt cleaning systems are commonly used to remove debris and other material adhering to the belts of conveyor systems. Such cleaning systems typically employ one or more scraper blades that are preloaded against the conveyor belt of a conveyor. It is not uncommon for the operating environment of such cleaning systems to be very hostile and often the environment may include combinations of moisture, dirt, abrasive materials, and/or corrosive materials and liquids. Additionally, belt joints or splices and large localized accumulations and/or large pieces of debris or material adhering to the belt must be accommodated by such conveyor cleaning systems. Given the demanding working environment and conditions commonly encountered by conveyor belt cleaning systems, there is a continuing need to provide conveyor belt cleaning systems which minimize the amount of maintenance, repair, and replacement required in order for the cleaning system to provide an acceptable cleaning/scraping of the conveyor belt.

SUMMARY OF THE INVENTION

In accordance with the present invention, an apparatus is provided for preloading a scraper blade against a conveyor belt in a conveyor cleaning system. The apparatus includes a blade support adapted to mount a scraper blade for engagement with a conveyor belt, a torsion member including a first end segment spaced from a second end segment along an axis, and a stop engageable with the second end segment to maintain the torsion member in a preloaded condition with the second end segment rotated about the axis relative to the first end segment to generate a preload between a scraper blade mounted on the blade support and a conveyor belt.

In one form, the first end segment has a cross section that is non-circular over at least 25% of its outer periphery to engage the blade support to restrict rotation of the first end segment relative to the blade support.

In one form, the first end segment has an essentially polygonal cross section engageable with the blade support to restrict rotation of the first end segment relative to the blade support.

In one form, the polygonal cross section is essentially rectangular.

In one form, the apparatus further includes a hollow stub shaft surrounding a portion of the torsion member. The stub shaft is engageable with the blade support to restrict rotation of the stub shaft relative to the blade support. The stub shaft is also engageable with a frame to restrict translational movement of the blade support relative to the conveyor belt while allowing rotation of the blade support about an axis relative to the conveyor belt.

In one form, the hollow stub shaft and the portion of the torsion member have generally conforming circular cross sections to allow relative rotation between the torsion member and the hollow stub shaft.

In one form, the blade support has a first end spaced from a second end, and the first end segment of the torsion member includes an elastomeric material. The first end segment is rotationally fixed to the blade support between the first and second ends of the blade support.

In one form, the blade support has a receptacle extending from one of the first and second ends towards the other of the first and second ends. The first end segment of the torsion member is engaged within the receptacle to rotationally fix the first end segment to the blade support.

In one form, the receptacle and the first end segment have generally conforming polygonal cross sections to rotationally fix the first end segment to the blade support while allowing the first end segment to translate relative to the blade support.

In one form, the first end segment of the torsion member is engageable with the blade support to restrict rotation of the first end segment relative to the blade support, and the second end segment includes at least one stop surface. The stop includes a flange, an opening in the flange for receiving the second end segment, at least one pair of apertures in the flange spaced on opposite sides of the opening and extending from the opening into the flange, and a stop pin engageable with the at least one pair of apertures and the at least one stop surface of the second end segment to restrict rotation of the second end segment with the torsion member in the preloaded condition.

In one form, the at least one pair of apertures is a plurality of circumferentially spaced holes extending radially through the flange, and the at least one stop surface is part of a cylindrical wall surface defining a hole extending through the second end segment of the torsion member.

In one form, the first end segment is formed from an elastomeric material, and the second end segment is formed from a second material having a higher modulus of elasticity than the elastomeric material. The elastomeric material is connected to the second material between the first and second end segments to restrict rotation of the first end segment relative to the second end segment. One of the first and second end segments is engageable with the blade support to restrict rotation of the one segment relative to the blade support. The stop is engageable with the other end segment to maintain the torsion member in the preloaded condition.

BRIEF DESCRIPTION OF THE DRAWINGS

FIG. 2 is a section view taken along line 2—2 in FIG. 1;

FIG. 3 is a section view taken along line 3—3 in FIG. 2; and

DETAILED DESCRIPTION OF THE PREFERRED EMBODIMENTS

Figure 1:
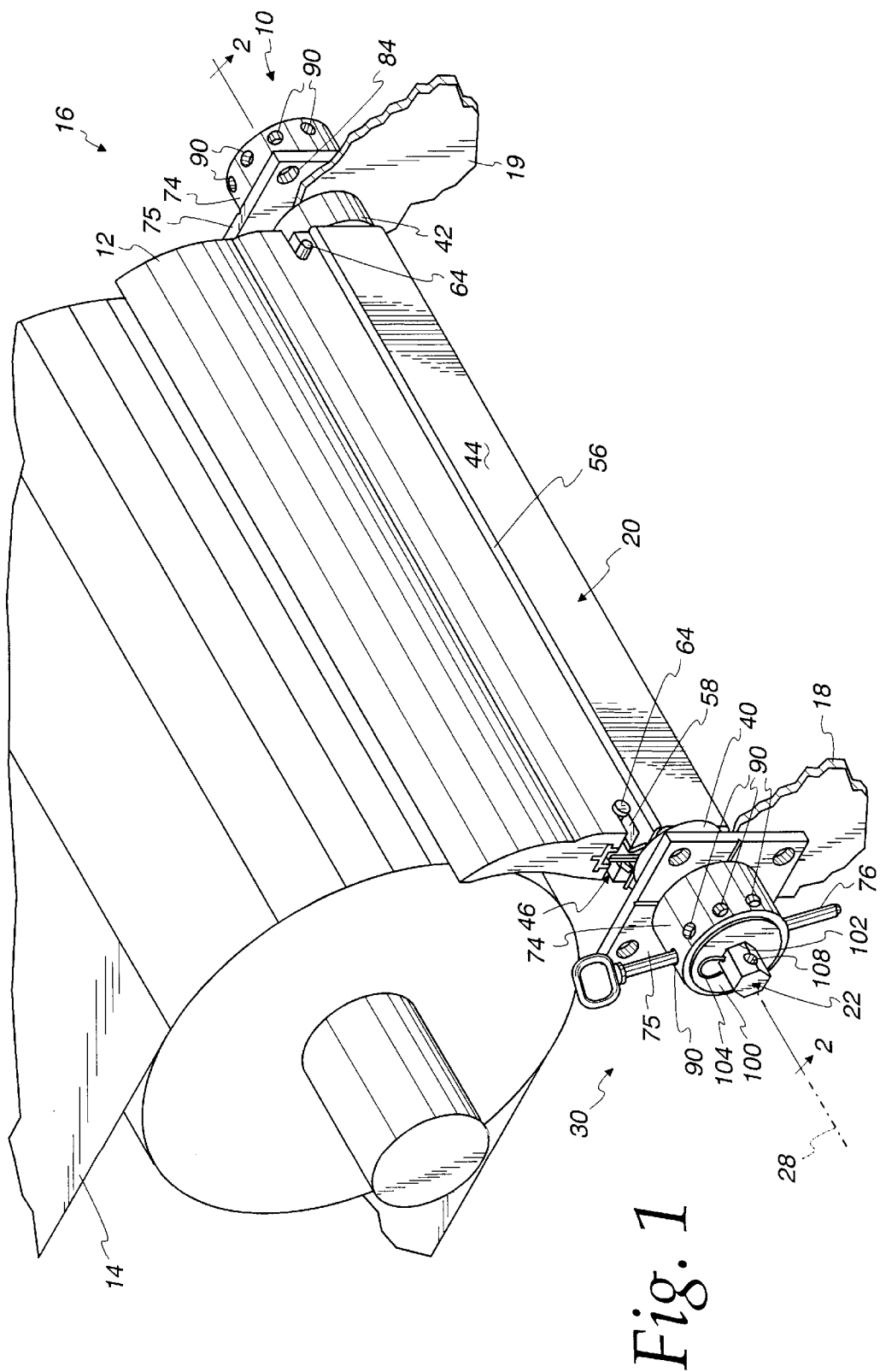
FIG. 1 is a perspective view of an apparatus embodying the present invention for preloading a scraper blade against a conveyor belt in a conveyor cleaning system.
Figure 4:
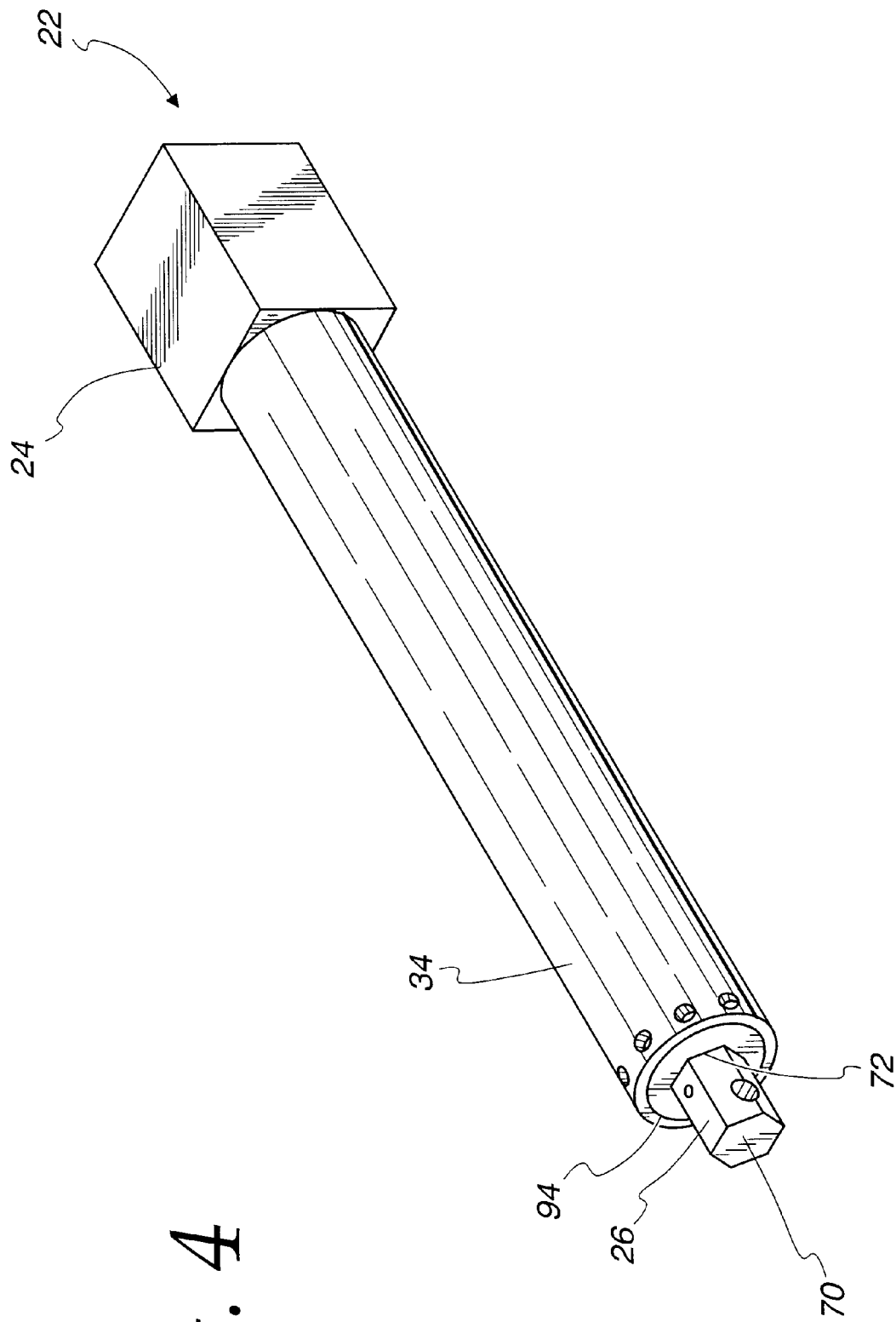
FIG. 4 is a perspective view of an assembly on the inventive apparatus through which a torsional force is generated to preload the scraper blade.

As seen in FIG. 1, the invention is embodied in an apparatus 10 for preloading a scraper blade 12 against a conveyor belt 14 in a conveyor belt cleaning system 16. The apparatus 10 is mounted between a pair of spaced frame members 18, 19.

As best seen in FIG. 2, the apparatus 10 includes a blade support 20 adapted to mount the scraper blade 12 for engagement with the conveyor belt 14, a torsion member 22 including a pair of end segments 24, 26 spaced from each other along an axis 28, and a stop, shown generally at 30, engaged with the end segment 26 to maintain the torsion member 22 in a preloaded condition with the end segment 26 rotated around the axis 28 relative to the end segment 24 to generate a preload between the scraper blade 12 mounted on the blade support 20 and the conveyor belt 14. The apparatus 10 further includes a pair of cylindrical stub shafts 32, 34 which mount the blade support 20 and the torsion member 22 to the frame members 18, 19 via respective cylindrical bushings 36, 38 to restrict translational movement of the blade support relative to the conveyer belt 14 while allowing rotation of the blade support 20 about the axis 28. The apparatus 10 also includes a pair of cylindrical locking collars 40, 42, each of which is engaged with one of the shafts 32, 34 to prevent translation of the shafts 32, 34, the torsion member 22, and the blade support 20 along the axis 28 relative to the frame members 18, 19.

As best seen in FIGS. 2 and 3, the blade support 20 includes a tube 44 having an essentially square cross section transverse to the axis 28, a blade mount 46 fixed to a side 48 of the tube 44, and a plurality of threaded bosses 50 fixed to another side 52 of the tube 44. The interior surface of the tube 44 defines a receptacle 53 having an essentially square cross section transverse to the axis 28 and extending from one end 54 of the tube 44 to the other end 55 of the tube 44, as best seen in FIG. 2. The blade mount 46 is formed from a pair of elongated members 56, each of which has an L-shaped cross section transverse to the axis 28. The blade mount 46 is adapted to engage an elongated slot 58 in the scraper blade 12. As best seen in FIG. 2, the blade mount 46 includes a pair of through holes 62 which are engaged by pins 64 to retain the scraper blade 12 to the blade mount 46. While a specific form of the blade mount 46 has been described, it should be understood that the blade mount 46 may be configured to be compatible with any of the many various types of scraper blades employed in the art. While the tube 44, blade mount 46, and bosses 50 may be formed of any suitable material that will provide adequate structural support for a scraper blade, it is preferred that these components be formed from a metal such as steel, with the members 54, 56 provided in the form of an angle iron that is welded or brazed to the tube 44, and the bosses 50 provided in the form of threaded nuts that are welded or brazed to the tube 44. Similarly, it should also be understood that the blade support 20 can be formed from a single unitary piece that is cast or machined to provide the required features, rather than being fabricated from multiple components.

As best seen in FIG. 2, the end segment 24 of the torsion member 22 is preferably formed from an elastomeric material, such as 93 Ester or 93A Urethane, and the end segment 26 of the torsion member 22 is preferably formed of a material, such as steel, having a higher modulus of elasticity than the elastomeric material of the end segment 24. As best seen in FIGS. 2 and 3, the end segment 24 extends into the receptacle 53 of the tube 44 and has an essentially polygonal cross section in the form of a square transverse to the axis 28 that conforms to, and is thereby keyed within, the square cross section of the receptacle 53 and extends over a length X along the axis 28. The end segment 26 is preferably formed from a solid bar 70 having a polygonal cross section transverse to the axis 28 in the general form of a hexagon. The bar 70 extends into a receptacle 72 formed in the elastomeric material between the end segments 24, 26. The receptacle 72 has a polygonal cross section that generally conforms to the polygonal cross section of the bar 70 to restrict relative rotation between the end segments 24, 26. More specifically, an end 73 of the bar 70 extends in the receptacle 72 to within a distance Y from the end segment 24. It should be appreciated that by varying the distance Y, the torsion member 22 can be configured to provide various torsional spring rates and thereby various preloading capabilities. More specifically, as the distance Y is decreased, the spring rate and preload capabilities of the torsion member 22 will be increased. Conversely, as the distance Y is increased, the torsional spring rate and preloading capabilities of the torsion member 22 will be decreased. Preferably, the elastomeric material is bonded to the bar 70 by a suitable bonding agent or by molding the elastomeric material around the bar 70.

The elastomeric material surrounding the bar 70 extends continuously from one axial end of the blade support toward the other axial end of the blade support 20 over at least one half the distance between the ends of the blade support.

One advantage of the polygonal cross sections of the end segment 24, the receptacle 53, the bar 70 and the receptacle 72 is that they provide a convenient form for a cross section that is non-circular, preferably over at least 25% of the outer periphery of the cross section, which keys the end segment 24 to the blade support 20 and thereby tends to provide effective shear resistance.

The stop 30 includes a cylindrically shaped flange 72, a bolt flange 74, a cylindrical stop pin 76, and a cylindrical hole 78 extending through the end segment 26 of the torsion member 22 to define a stop surface 80 that engages the pin 78. The flanges 72, 74 are preferably made from a structural material, such as steel, and are integrally joined, such as by brazing, welding, or are machined or cast as a unitary piece. A cylindrical bore 82 centered on the axis 28 extends through the flanges 72, 74. The bushing 38 is mounted in the bore 82 by an interference fit or by bonding or molding the bushing 38 to the bore 82. Accordingly, the flanges 72, 74 and the bushing 38 form an integral subassembly that is fixed to the frame member 19 via fasteners (not shown) that extend through a plurality of through bores 84 in the flange 74. An identical subassembly, using the bushing 36, is fixed to the frame 18 on the opposite side of the apparatus 10 to mount the stub shaft 32. While the bushings 36, 38 may be formed from any suitable bearing material, the bushings 36, 38 are preferably formed from 93 Ester or 93A Urethane.

The flange 72 includes a pair of apertures 86, 88 spaced on opposite sides of the cylindrical bore 82, extending from the opening 82 into the flange 72. Preferably, the apertures 86, 88 are provided in the form of a plurality of paired, cylindrical through holes 90 that extend radially through the flange 72 to allow the torsion member 22 to be maintained in a plurality of preloaded conditions with the second end 26 rotated about the axis 28 relative to the end segment 24.

The stub shafts 32, 34 are preferably identical and formed from a suitable structural material such as cylindrical stainless steel tubing. Each of the stub shafts 32, 34 extends into the receptacle 53 of the tube 44 and is fixed to the blade support 20 by a plurality of square head set screws 91 that are threaded into the bosses 50 to engage the stub shafts 32, 34. Each of the stub shafts 32, 34 includes a cylindrical through bore 92. The through bore 92 of the stub shaft 34 surrounds a cylindrical outer surface 94 of the torsion member 22 that extends between the end segments 24, 26. A loose fit between the bore 92 and the surface 94 allows relative rotation between the stub shaft 34 and the torsion member 22.

One advantage of the stub shafts 32, 34 is that they are located relative to the elastomeric material of the torsion member 22 and define walls with surfaces to shield the elastomeric material from contaminants, such as dirt and other materials and liquids from the conveyor belt 14, in the working environment of the cleaning system. The tube 44, the flanges 72, 74 and the bushings 36, 38 also provide such shielding.

The locking collars 40, 42 may be formed from any suitable structural material, such as from steel tubing. Each of the collars 40, 42 includes a threaded bore 96 that receives a square headed set screw 98 that locks the respective collars 40, 42 to their respective stub shafts 32, 34. The collars 40, 42 have respective bearing surfaces 98, 99 that extend perpendicularly to the axis 28 and bear against the respective frames 18, 19 to restrict translational movement of the stub shafts 32, 34, the blade support 20, and the torsional member 22 along the axis 28.

As best seen in FIG. 1, the apparatus 10 also includes a protective washer 100 that is mounted to the end segment 26. More specifically, the washer 100 includes a hexagonal opening 102 that conforms to the hexagonal cross section of an exposed portion of the end segment 26 which extends through the washer 100. A hitch pin 104 retains the washer 100 on the end segment 26.

In operation, the apparatus is assembled with the torsion member 22 in a "free" or unloaded condition, with no relative rotation between the end segments 24, 26. After the apparatus 10 is assembled to the frame members 18, 19, a tool is used to engage either the hexagonal cross section of an exposed cantilevered portion of the rod 70 or a through hole 108 that extends through the exposed portion of the rod 70. With reference to FIG. 1, a user then operates the tool to rotate the end segment 26 counterclockwise relative to the end segment 24 to generate a predetermined preload between the scraper blade 12 and the conveyor belt 14. When the counterclockwise rotation generates the predetermined preload, the stop pin 76 is engaged through the appropriate hole pair 90 and the bore 80 in the end segment 26 to maintain the torsion member 22 in the preloaded condition with the end segment 26 rotated around the axis 28 relative to the end segment 24. As the belt 14 is moved past the blade 12, the rotational mounting provided by the stub shafts 32, 34 and the bushings 36, 38 combines with the resiliency of the torsion member 22 to allow the blade 12 to follow the surface of the moving conveyor belt 14 while encountering belt joints or splices in the conveyor belt 14 as well as large localized accumulations and/or large pieces of debris or material adhering to the belt 14.

Further, as previously discussed, the stub shafts 32, 34, the tube 44, the flanges 72, 74 and the bushings 36, 38 tend to protect or shield the elastomeric material of the torsion member 22 from contaminants in, and moving through, the working environment.

It should be appreciated that, because identical stub shafts 32, 34, identical locking collars 40, 42, and identical flanges 72, 74 and bushings 36, 38 are provided on each side of the apparatus 10, the apparatus 10 may be assembled with the end segment 26 of the torsion member 22 extending from either end 54, 55 of the blade mount 20 to engage either of the frame members 18, 19 via the stop 30. It should also be appreciated that the cross sections of the tube 44, the torsion member 22 and the stub shafts 32, 34 allow translational movement of the torsion member 22 and the stub shafts 32, 34 along the axis 28 when the set screws 93 are not engaged with the stub shafts, 32, 34. These features simplify the assembly of the apparatus 10 to the frame members 18, 19. It should further be appreciated that the conforming cross sections of the end segment 24 and the receptacle 53 allow the torsion member 22 to transmit torsional loads to the blade support 20 while also allowing translational movement of the end segment 24 relative to the tube 44 caused by the twisting of the torsion member 22.

The foregoing disclosure of specific embodiments is intended to be illustrative of the broad concepts comprehended by the invention.

I claim:

1. An apparatus for preloading a scraper blade against a conveyor belt in a conveyor cleaning system, the apparatus comprising:

a blade support adapted to mount a scraper blade for engagement with a conveyor belt;

a torsion member including a first end segment spaced from a second end segment along a first rotational axis and having ends spaced along the first axis with a length between the first and second spaced ends, the first end segment formed from an elastomeric material, the second end segment formed from a second material having a higher modulus of elasticity than the elastomeric material, the elastomeric material connected to the second material between the first and second end segments to restrict rotation of the first end segment relative to the second end segment, one of the first and second end segments engageable with the blade support to restrict rotation of the one segment relative to the blade support; and a stop engageable with the other end segment to maintain the torsion member in a preloaded condition with the second end segment rotated around the first axis relative to first end segment to generate a preload between a scraper blade mounted on the blade support and a conveyor belt, the torsion member comprising a bar that is embedded in the elastomeric material over at least one half the length of the torsion member so as to be keyed to rotate with the elastomeric material around the first axis.

2. The apparatus of claim 1 wherein the blade support has a receptacle extending from one of the first and second ends towards the other of the first and second ends, and the first end segment is engaged within the receptacle to rotationally fix the first end segment to the blade support.

3. The apparatus of claim 2 wherein the receptacle and the first end segment have generally conforming polygonal cross sections to rotationally fix the first end segment to the blade support while allowing the first end segment to translate relative to the blade support.

4. The apparatus of claim 2 further comprising:

a frame for supporting the torsion member and the blade support relative to a conveyor belt; and a hollow stub shaft surrounding a portion of the torsion member between the first and second end segments, the stub shaft engaged in the receptacle to restrict rotation of the stub shaft relative to the blade support, the stub shaft extending from the receptacle for engagement with the frame to restrict translational movement of the blade support relative to the conveyor belt while allowing rotation of the blade support about an axis relative to the conveyor belt.

5. The apparatus of claim 4 wherein the hollow stub shaft and the portion of the torsion member have generally conforming circular cross sections to allow relative rotation of the torsion member relative to the hollow stub shaft.

6. An apparatus for preloading a scraper blade against a conveyor belt in a conveyor cleaning system, the apparatus comprising:

a blade support adapted to mount a scraper blade for engagement with a conveyor belt;

a torsion member including a first end segment made from an elastomeric material and having an outer periphery and spaced from a second end segment along an axis, the first end segment having a cross section that is non-circular at its outer periphery to engage the blade support so that the non-circular outer periphery is keyed to the blade support to restrict rotation of the first end segment relative to the blade support; and a stop engageable with the second end segment to maintain the torsion member in a preloaded condition with the second end segment rotated around the axis relative to the first end segment to generate a preload between a scraper blade mounted on the blade support and a conveyor belt.

7. The apparatus according to claim 6 wherein the torsion member comprises a bar that is embedded in the elastomeric material.

8. The apparatus of claim 6 further comprising:

a hollow stub shaft surrounding a portion of the torsion member, the stub shaft engageable with the blade support to restrict rotation of the stub shaft relative to the blade support, the stub shaft engageable with a frame for guided rotation of the blade support about an axis relative to the conveyor belt while restricting translational movement of the blade support relative to the conveyor belt along the axis.

9. The apparatus of claim 8 wherein the hollow stub shaft and the portion of the torsion member have generally conforming circular cross sections to allow relative rotation between the torsion member and the hollow stub shaft.

10. The apparatus of claim 1 wherein the first end segment has an essentially polygonal cross section engageable with the blade support to restrict rotation of the first end segment relative to the blade support.

11. The apparatus of claim 10 wherein the polygonal cross section is essentially rectangular.

12. The apparatus according to claim 6 wherein the torsion member resides at least partially within the blade support.

13. The apparatus according to claim 12 wherein the blade support has a central axis and axially spaced first and second ends with a length between the first and second ends and the torsion member comprises an elastomeric material that extends from the first end of the blade support toward the second end of the blade support a distance equal to at least one half the length between the first and second ends.

14. The apparatus according to claim 13 wherein the torsion member comprises a bar that is embedded in the elastomeric material and has an end that projects from the first end of the blade support so as to be engageable to pivot the bar and in turn the blade support around the central axis.

15. The apparatus according to claim 14 wherein the bar does not extend fully through the first end segment.

16. The apparatus according to claim 14 wherein the end of the bar that projects from the first end of the blade support has a polygonal outer surface to be engaged by a wrench to facilitate pivoting of the bar by a wrench.

17. The apparatus according to claim 16 wherein the elastomeric material has a first modulus of elasticity and the bar comprises a material having a modulus of elasticity higher than the first modulus of elasticity.

18. An apparatus for preloading a scraper blade against a conveyor belt in a conveyor cleaning system, the apparatus comprising:

a blade support adapted to mount a scraper blade for engagement with a conveyor belt, the blade support having a first end spaced from a second end and a receptacle extending from one of the first and second ends towards the other of the first and second ends;

a torsion member including a first end segment spaced from a second end segment along an axis, the first end segment comprising an elastomeric material and being rotationally fixed to the blade support within the receptacle between the first and second ends of the blade support; and a stop engageable with the second end segment to maintain the torsion member in a preloaded condition with the second end segment rotated around the axis relative to first end segment to generate a preload between a scraper blade mounted on the blade support and a conveyor belt.

19. The apparatus of claim 18 wherein the receptacle and the first end segment have generally conforming polygonal cross sections to rotationally key the first end segment to the blade support while allowing the first end segment to translate relative to the blade support.

20. The apparatus of claim 18 further comprising:

a frame for supporting the torsion member and the blade support relative to a conveyor belt; and a hollow stub shaft surrounding a portion of the torsion member between the first and second end segments, the stub shaft engaged in the receptacle to restrict rotation of the stub shaft relative to the blade support, the stub shaft extending from the receptacle for engagement with the frame to restrict translational movement of the blade support relative to the conveyor belt while allowing rotation of the blade support about an axis relative to the conveyor belt.

21. The apparatus of claim 20 wherein the hollow stub shaft and the portion of the torsion member have generally conforming circular cross sections to allow relative rotation of the torsion member relative to the hollow stub shaft.

22. An apparatus for preloading a scraper blade against a conveyor belt in a conveyor cleaning system, the apparatus comprising:

a blade support adapted to mount a scraper blade for engagement with a conveyor belt;

a torsion member including a first end segment spaced from a second end segment along an axis, the first end segment engageable with the blade support to restrict rotation of the first end segment relative to the blade support, the second end segment including at least one stop surface and rotatable relative to the blade support; and a stop engageable with the second end segment to maintain the torsion member in a preloaded condition with the second end segment rotated around the axis relative to first end segment to generate a preload between a scraper blade mounted on the blade support and a conveyor belt, the stop comprising a flange, an opening in the flange for receiving the second end segment, at least one pair of apertures in the flange spaced on opposite sides of the opening and extending from the opening into the flange, and a stop pin engageable with the at least one pair of apertures and the at least one stop surface of the second end segment to restrict rotation of the second end segment with the torsion member in the preloaded condition, the torsion member having an exposed portion at the second end segment that can be engaged and rotated by a user to generate a desired preload between a scraper blade mounted on the blade support and a conveyor belt.

23. The apparatus of claim 22 wherein the at least one pair of apertures is a plurality of circumferentially spaced holes extending radially through the flange, and the at least one stop surface is part of a cylindrical wall surface defining a hole extending through the second end segment.

24. The apparatus of claim 22 wherein the first end segment is formed from elastomeric material and the second end segment is formed from a second material having a higher modulus of elasticity than the elastomeric material that projects from the elastomeric material in cantilever fashion to define the exposed portion at the second end segment.

25. An apparatus for preloading a scraper blade against a conveyor belt in a conveyor cleaning system, the apparatus comprising:
   a torsion member including a first end segment spaced from a second end segment along an axis, the end segments being rotatable about the axis relative to each other to generate a preload between a scraper blade and a conveyor belt, at least a portion of the torsion member being formed from an elastomeric material having an axial extent; and
   at least one wall surface surroundingly located relative to the torsion member to shield substantially the entire axial extent of the elastomeric material of the torsion member from contaminants moving through the operating environment of the cleaning system.

26. The apparatus of claim 25 wherein the at least one wall surface surrounds the portion of the torsion member in the radial direction.

27. The apparatus of claim 25 wherein the at least one wall surface comprises at least a portion of a hollow stub shaft that is engageable with a frame to restrict translational movement of the torsion member relative to a conveyor belt while allowing rotation of the torsion member relative to the conveyor belt.

28. The apparatus of claim 25 wherein the at least one wall surface comprises a portion of a blade support adapted to mount a scraper blade for engagement with a conveyor belt.

29. The apparatus according to claim 28 wherein the stop comprises a flange, an opening in the flange for receiving the second end segment, at least one pair of apertures in the flange spaced on opposite sides of the opening and extending from the opening into the flange, and a stop pin engageable with the at least one pair of apertures and the at least one stop surface of the second end segment to restrict rotation of the second end segment with the torsion member in the preloaded condition.

* * * * *